(12) United States Patent
Howlett et al.

(10) Patent No.: US 7,762,125 B2
(45) Date of Patent: Jul. 27, 2010

(54) METHOD FOR MONITORING THRUST PRODUCED BY GAS TURBINE ENGINES

(75) Inventors: Matthew I. Howlett, Bristol (GB); Charmaine H. Cordo, Bristol (GB); Karen S. Sollars, Varese (IT)

(73) Assignee: Rolls-Royce PLC, London (GB)

( * ) Notice: Subject to any disclaimer, the term of this patent is extended or adjusted under 35 U.S.C. 154(b) by 800 days.

(21) Appl. No.: 11/714,728

(22) Filed: Mar. 7, 2007

(65) Prior Publication Data

US 2007/0220897 A1  Sep. 27, 2007

(30) Foreign Application Priority Data

Mar. 24, 2006 (GB) .................................. 0606022.2
Jan. 24, 2007 (GB) .................................. 0701399.8

(51) Int. Cl.
*G01M 15/14* (2006.01)

(52) U.S. Cl. .................................................. 73/112.04

(58) Field of Classification Search ............. 73/112.01, 73/112.03, 112.04, 112.05, 112.06
See application file for complete search history.

(56) References Cited

U.S. PATENT DOCUMENTS

| | | | |
|---|---|---|---|
| 3,736,796 A * | 6/1973 | Hohenberg ............... 73/178 T |
| 4,136,517 A * | 1/1979 | Brown ........................ 60/223 |
| 4,215,412 A | 7/1980 | Bernier et al. | |
| 4,313,167 A * | 1/1982 | Brown ........................ 701/100 |
| 4,651,563 A | 3/1987 | Zweifel | |
| 4,954,974 A * | 9/1990 | Howell et al. ............... 701/100 |
| 5,622,045 A | 4/1997 | Weimer et al. | |
| 6,459,963 B1 * | 10/2002 | Bennett et al. ................. 701/3 |
| 6,487,490 B1 * | 11/2002 | Kamath et al. ............. 701/100 |
| 6,578,794 B1 * | 6/2003 | Clark et al. ................ 244/75.1 |
| 6,659,712 B2 * | 12/2003 | Brooks et al. .................. 415/1 |
| 6,687,596 B2 * | 2/2004 | Humerickhouse et al. ... 701/100 |
| 2007/0260424 A1 * | 11/2007 | Brown et al. ................ 702/182 |
| 2008/0302081 A1 * | 12/2008 | Snell et al. ............... 60/39.093 |

FOREIGN PATENT DOCUMENTS

| | | |
|---|---|---|
| GB | 2 181 250 A | 4/1987 |
| GB | 2 414 560 A | 11/2005 |
| GB | 2 424 490 A | 9/2006 |
| RU | 2 255 247 C1 | 6/2005 |

OTHER PUBLICATIONS

British Patent Office, "British Search Report for British Application No. GB0701399.8," dated: Feb. 28, 2007, p. 10.

* cited by examiner

*Primary Examiner*—Eric S McCall
(74) *Attorney, Agent, or Firm*—Oliff & Berridge, PLC

(57) ABSTRACT

A method for providing an indication of thrust available from a gas turbine engine, the method comprises measuring fan aerodynamic speed to produce an actual fan aerodynamic speed measurement, determining a difference between the actual fan aerodynamic speed measurement and an expected fan aerodynamic speed measurement, and if the difference is less than a predetermined threshold value, indicating that sufficient thrust is available.

6 Claims, 3 Drawing Sheets

METHOD FOR MONITORING THRUST PRODUCED BY GAS TURBINE ENGINES

The present invention relates to monitoring gas turbine engines, and in particular relates to monitoring the thrust produced by gas turbine engines.

BACKGROUND OF THE INVENTION

Many aircraft make use of one or more gas turbine engines for propulsion. Before take-off, an aircraft's pilot must determine that the available gas turbine engine thrust is sufficient for safe operation of the aircraft. It is also desirable to determine whether an engine is running at a higher temperature than expected, as such "hot" running can indicate deterioration of the engine.

Currently, pilots are provided with look-up tables of information which must be manually checked before take-off. This is known as a "placard check". Naturally, manually checking has high risk factors, associated with misinterpretation of data and incorrect reading of the lookup tables as well as adding time to the pre-flight check procedure. In addition, such a manual system is unable to adequately compensate for changes in ambient conditions.

Accordingly, the present invention seeks to provide a system which can overcome these disadvantages.

SUMMARY OF THE PRESENT INVENTION

According to one aspect of the present invention, there is a method of providing an indication of the thrust available from a gas turbine engine, the method comprising:

operating the engine within a predetermined power range;
measuring fan mechanical speed of the engine to produce an actual fan aerodynamic speed for the gas turbine;
determining a difference between the actual fan aerodynamic speed measurement and an expected fan aerodynamic speed measurement for the engine, and if the difference is less than a predetermined threshold level, indicating that required thrust is available from the gas turbine engine in said predetermined power range.

Such a method can further comprise, if the difference is less than a predetermined threshold value, the steps of:

determining a turbine outlet temperature, to produce an actual outlet temperature;
determining a difference between the actual outlet temperature and a predetermined outlet temperature value, and if that difference is greater than a predetermined threshold value, indicating that sufficient temperature margin is available to achieve required thrust.

When such is used in an aircraft, such measuring steps are carried out only if the aircraft is on the ground.

Preferably, such measuring steps are carried out only if the engine is operating at maximum power, or within a predetermined range at a high power engine setting. That is to say the engine is set to achieve a desired engine setting which is indicative of the engine condition necessary to achieve take off.

Preferably, such measuring steps are carried out only if an engine controller is functioning correctly, and controlling the engine to within a predetermined range at maximum power.

According to another aspect of the present invention, there is provided, a gas turbine engine system, comprising a gas turbine engine, a controller operable to control the engine, and a monitoring unit operable to perform steps in such a method.

DETAILED DESCRIPTION OF PREFERRED EMBODIMENT

Figure 1:
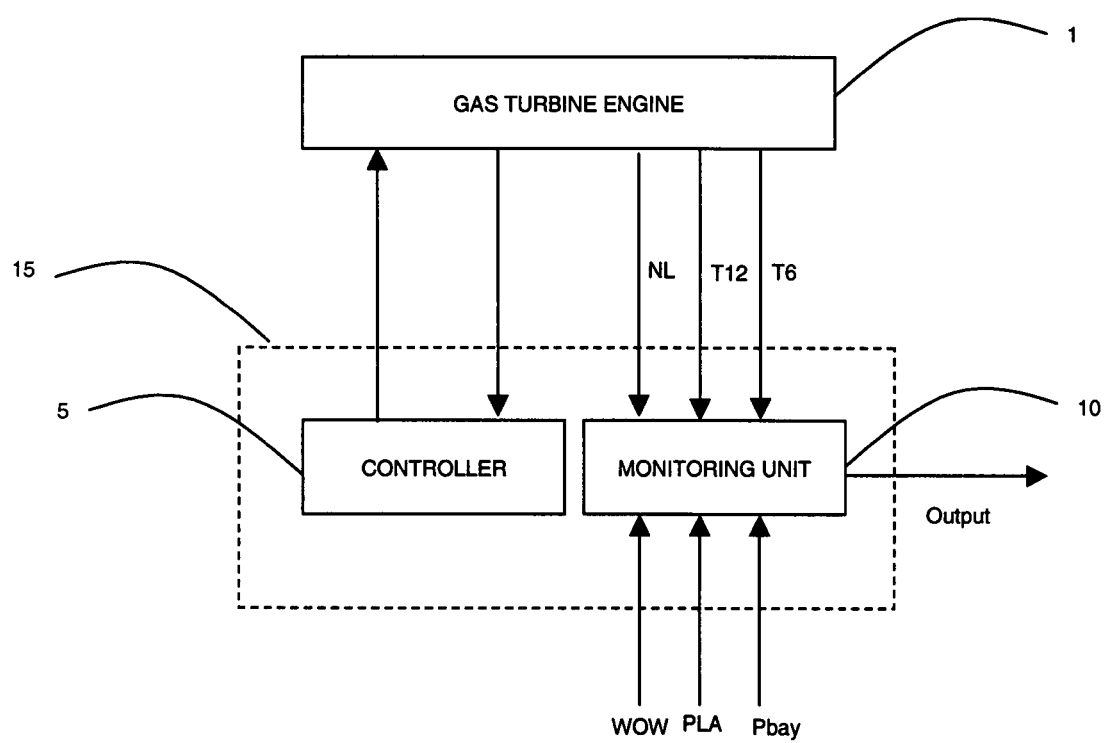
FIG. 1 is a schematic block diagram illustrating a gas turbine engine, its associated controller, and a monitoring unit in accordance with one aspect of the present invention.

FIG. 1 is a block diagram illustrating a gas turbine engine 1 and an associated controller 5, and a monitoring unit 10 according to the present invention. In the embodiment shown the control unit 5 and monitoring unit 10 comprise part of an engine control unit 15. As is well known, the controller 5 provides electronic feedback control of the gas turbine engine 1. The nature of this control, the techniques used and the details of all the inputs and outputs necessary for controlling the gas turbine will not be described here for the sake of clarity.

The monitoring unit 10 operates to provide an indication to the pilot or aircraft control system (for example, for an unmanned air vehicle) that the thrust available from the gas turbine engine is sufficient for the safe operation of the aircraft, within predetermined limits. In order to provide this determination, the monitoring unit measures the mechanical low pressure spool speed (NL) of the gas turbine engine and from this calculates the actual fan aerodynamic speed (NLRT), using $NL/\sqrt{\theta}$, where $\theta$=engine inlet temperature (T12)/standard temperature.

The monitoring unit 10 also monitors the turbine (outlet) temperature T6 of the engine 1, as will be described below.

In order that the pre-flight check can be carried out, it must be determined that the aircraft is on the ground, that is that the "weight on wheels" (WOW) condition is true. It is also necessary to determine that the throttle setting (Pilot's Lever Angle, PLA) is on maximum, or within a predetermined amount of maximum for sufficient time for the engine to reach operational temperature. It is also necessary to determine that the engine controller 5 is controlling the engine to maximum or within a predetermined range at a high power engine setting, and that the engine controller is functional.

Figure 2:
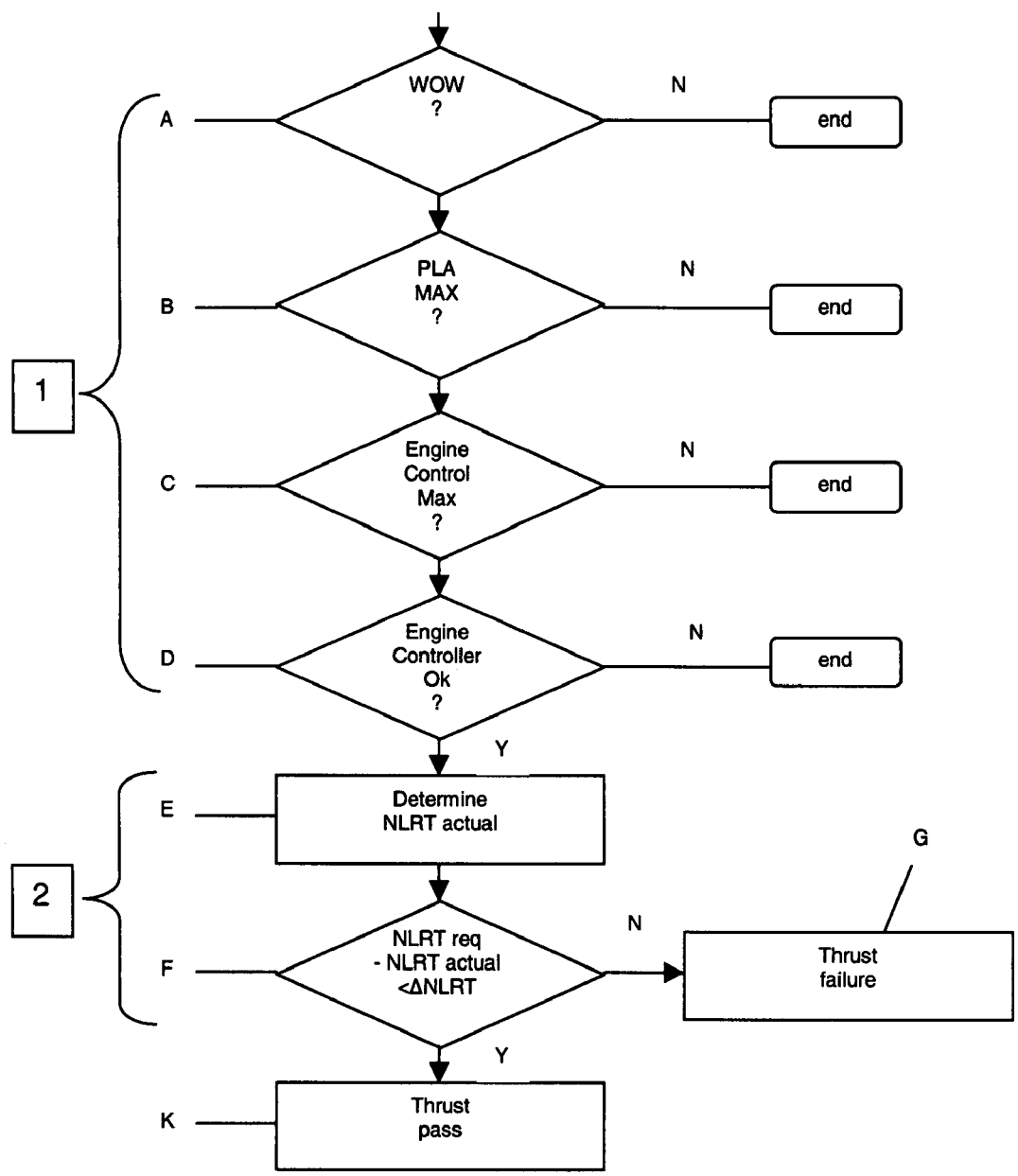
FIG. 2 is a flow chart illustrating steps in a method embodying another aspect of the present invention.

A method embodying the present invention will now be described with reference to FIG. 2. At step A, the weight on wheels (WOW) determination is made, in order to confirm that the aircraft is on the ground. Preferably, the aircraft must have been on the ground for a predetermined time period, such as 30 seconds. If this WOW condition is met, then it is determined whether the pilot's lever angle (the throttle setting) is at maximum or within a predetermined range at a high power engine setting, step B. At step C, it is determined whether the engine controller is controlling the engine to maximum, and at step D it is determined whether the engine controller is functional. It will be readily appreciated that steps A to D can be carried out in any order, or simultaneously. The only requirement is that all four parameters are checked and that PLA is set to maximum high power setting for a predetermined length of time (for example 2 or 3 seconds while the engine is at maximum high power operating temperature) so that it is clearly established that the right condition to be assessed has been reached.

Assuming that steps A to D all result in positive answers, then the actual fan aerodynamic speed is determined. The fan aerodynamic speed is given by:

FAS=NL/√θ, where θ=engine inlet temperature (T12)/ standard temperature and NL is the mechanical low pressure spool speed.

Figure 3:
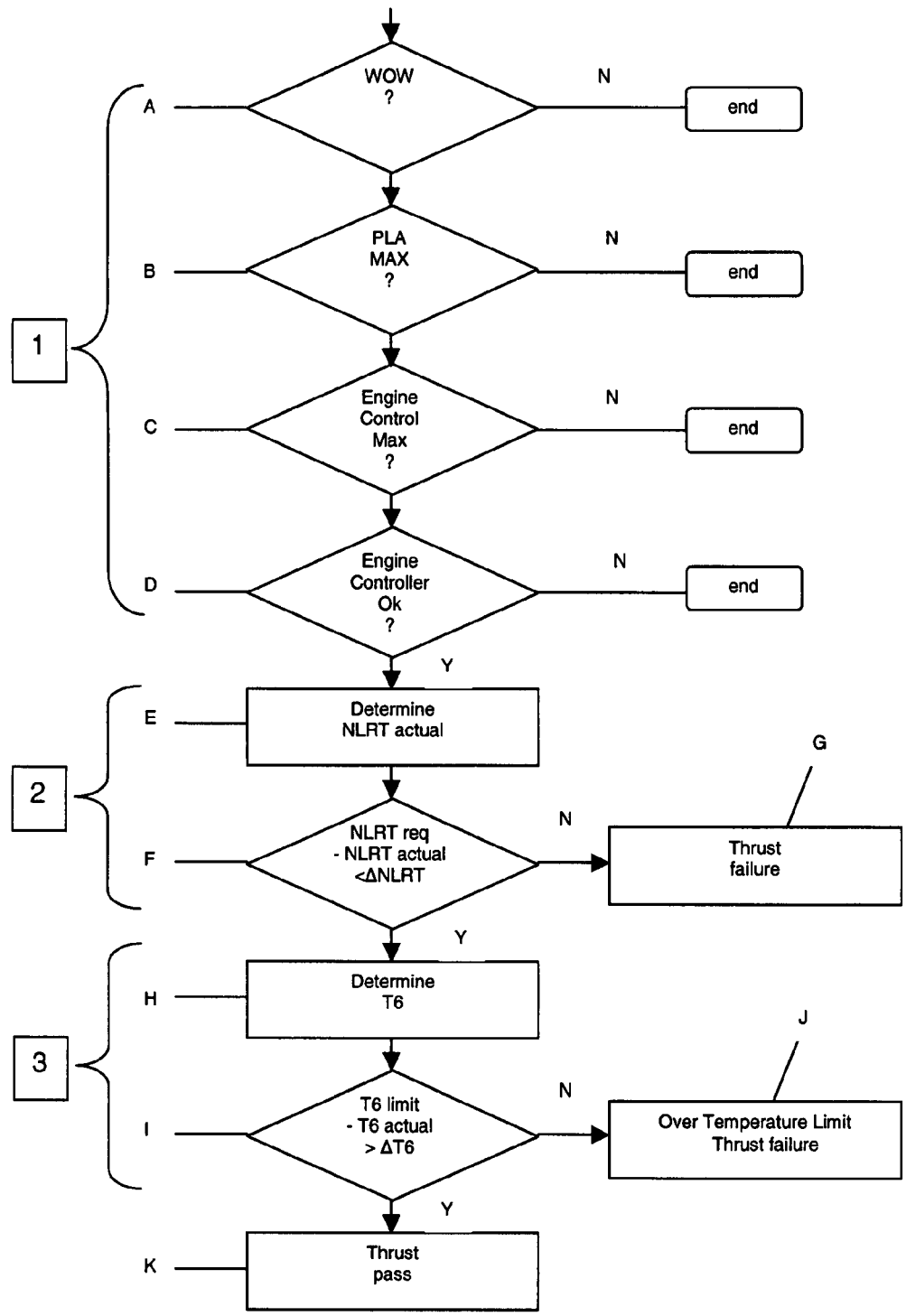
FIG. 3 is a flow chart illustrating steps in an alternative method to that presented in FIG. 2.

In step F, the difference between the actual NLRT value (NLRT$_{actual}$) and the expected or required NLRT value (NLRT$_{req}$) is determined and compared to a threshold value. The tolerance (ΔNLRT) is determined in consideration of engine inlet temperature (T12) and engine bay pressure (PBAY) which is an indicator of altitude. If the difference is greater than this threshold value, then the amount of thrust available from the gas turbine engine is determined as being too low, and a thrust failure indication is made (step G). If, however, the difference is less than the threshold value, then an indication of thrust is made (step K). Alternatively, and as shown in FIG. 3, the process moves to step H in which the turbine outlet temperature T6 is determined.

In step H, the turbine outlet temperature T6 is determined (T6$_{actual}$), and at step I is compared with an expected, or limiting, value (T6$_{limit}$). If the difference between these temperature values (ΔT6) is more than a threshold value, then the engine is operating within desired limits for the given day temperature, and an indication that the expected level of thrust is available is given to the pilot (step K). However if the difference is less than the threshold value then a thrust failure indication is made (step J) as such a value of ΔT6 is indicative that sufficient temperature margin is not available to achieve required thrust.

Deteriorated gas turbine engines tend to run at higher temperatures (T6) than non-deteriorated engines. Accordingly, the T6 measurement and comparison is important to give an indication of the presence of a deteriorated engine. In addition, such a deteriorating engine could fail the NLRT check on a hot day due to operation on the T6 limit, but could produce adequate thrust on a cold day. If the NLRT measurement is passed, but the measured T6 level is too close to the T6 limit, then the engine can be considered to be running hotter than expected, which is an indication that adequate thrust will not be available.

Additionally, engine running hotter than expected is a symptom of other engine problems, for example a leaking or erroneously open bleed valve, which will be detrimental to the performance of the aircraft. Hence the present invention can be employed to identify a plurality of engine problems.

On a hot day (that is to say, ambient air temperature is above a predetermined value), the result of the T6 measurement and comparison (step H) may be ignored if air temperature is sufficient for engine operation on the T6 limit expected during normal operation.

In an application where the engine operating temperature is measured in the Low Pressure Turbine (LPT) or at outlet from the turbine (ie in the jet pipe), an allowable engine temperature difference (ΔT6) may typically be in the range of 25 to 100° C.

The threshold levels for NLRT and temperature limits are preferably based on known engine models specific to the type of engine concerned.

In a preferred embodiment, the thresholds relating to NLRT and T6 are set to represent an engine which has run for a number of hours equivalent to a typical overhaul period for a gas turbine engine. For example the thresholds may be set to represent an engine which has run for 4000 hours.

The pilot may be provided with a cockpit-mounted indicator light that is illuminated (or switched off) when the thrust passed message is determined. Alternatively the thrust failure or acceptance could take the form of a signal sent to a control system to abort or allow take off (for example in an unmanned air vehicle).

In an alternative embodiment, steps F and H are carried out in parallel, hence a negative result in step F will not prevent step H from being executed.

The monitoring unit is configured such that the method of the present invention is worked only prior to aircraft take off. That is to say, the thrust indication is only determined when the aircraft is on the ground and when the PLA is set to maximum or within a predetermined range at a high power engine setting. After the engine has reached an assumed operational temperature (typically after about 2-3 secs with WOW=true and throttle at maximum) then the pre-flight check according to the present invention is executed. If sufficient thrust is available, and a "GO" indication has been given to the pilot and/or engine control system, the monitor can be configured to cease to indicate thrust status typically after 3 secs as pre-flight conditions are irrelevant to the operation of the in flight aircraft.

Additionally, if the monitoring equipment does not return a signal which indicates sufficient thrust is available and/or that the engine is running too hot, then the monitoring equipment will store and/or display a fault code which indicates which of steps A to K has indicated a fault/error. Alternatively the monitoring equipment will store and/or display a fault code which indicates which group or groups of steps has indicated a fault/error. That is to say, by way of non limiting example, and as shown in FIG. 3, the steps A to K can be divided up in groups such that group "1" comprises steps A to D, group "2" relates to steps E to G and group "3" relates to steps H to J. Thus group "1" failure signal will indicate that at least one of steps A to D has identified an error.

The invention claimed is:

1. A method of providing an indication of thrust available from a gas turbine engine, the method comprising:
    operating the gas turbine engine within a predetermined power range;
        measuring fan mechanical speed of the engine to produce an actual fan aerodynamic speed measurement;
        determining a difference between the actual fan aerodynamic speed measurement and an expected fan aerodynamic speed measurement for the engine; and
        if the difference is less than a predetermined threshold value, indicating that required thrust is available from the engine in the predetermined power range.

2. The method as claimed in claim 1, wherein, if the difference is less than a predetermined threshold value, the method further comprises:
    determining a turbine outlet temperature, to produce an actual outlet temperature;
    determining a difference between the actual outlet temperature and a predetermined outlet temperature value, and if that difference is greater than a predetermined threshold value, indicating that sufficient temperature margin is available to achieve required thrust.

3. The method as claimed in claim 1, for use in an aircraft, wherein the method is carried out only if the aircraft is on the ground.

4. The method as claimed in claim 1, wherein the method is carried out only if the engine is operating within a predetermined range at maximum power.

5. The method as claimed in claim 1, wherein the method is carried out only if an engine controller is functioning correctly, and controlling the engine to within a predetermined range at maximum power.

6. A gas turbine engine system, comprising a gas turbine engine, a controller operable to control the engine, and a monitoring unit operable to perform steps in the method as claimed in claim 1.

* * * * *